(12) United States Patent
Waltemathe et al.

(10) Patent No.: US 9,346,131 B2
(45) Date of Patent: May 24, 2016

(54) NICKEL-BASED SOLDER ALLOY

(75) Inventors: Markus Waltemathe, Hannover (DE); Frank Seidel, Isernhagen H.B. (DE); Jürgen Rösing, Sehnde (DE); Harald Krappitz, Kirchheim (DE)

(73) Assignee: MTU Aero Engines AG, Munich (DE)

( * ) Notice: Subject to any disclaimer, the term of this patent is extended or adjusted under 35 U.S.C. 154(b) by 634 days.

(21) Appl. No.: 13/808,053

(22) PCT Filed: Jun. 16, 2011

(86) PCT No.: PCT/DE2011/001300
§ 371 (c)(1),
(2), (4) Date: Mar. 25, 2013

(87) PCT Pub. No.: WO2012/065581
PCT Pub. Date: May 24, 2012

(65) Prior Publication Data
US 2013/0270325 A1    Oct. 17, 2013

(30) Foreign Application Priority Data
Jul. 3, 2010 (DE) .......................... 10 2010 026 048

(51) Int. Cl.
| B23K 31/00 | (2006.01) |
| B22F 1/00 | (2006.01) |
| B23K 35/22 | (2006.01) |
| C22C 19/05 | (2006.01) |
| C22C 1/04 | (2006.01) |
| B23K 35/30 | (2006.01) |
| C22C 1/02 | (2006.01) |

(52) U.S. Cl.
CPC ........... *B23K 35/3033* (2013.01); *B23K 35/304* (2013.01); *C22C 1/02* (2013.01); *B23K 2201/001* (2013.01); *B23K 2203/08* (2013.01); *F05B 2230/237* (2013.01); *F05B 2230/238* (2013.01)

(58) Field of Classification Search
CPC ............. B23K 35/3033; B23K 35/304; B23K 2201/001; B23K 2203/08; C22C 19/051; C22C 19/052; C22C 19/053; C22C 19/055; C22C 19/056; C22C 19/057; C22C 1/02; B22F 2998/00; B22F 2998/10; B23P 6/007; F05B 2230/237; F05B 2230/328
See application file for complete search history.

(56) References Cited

U.S. PATENT DOCUMENTS

| 4,410,490 | A |   | 10/1983 | Ray et al. |
| 4,507,264 | A |   | 3/1985  | Stern et al. |
| 4,830,934 | A | * | 5/1989  | Ferrigno et al. ............. 428/678 |
| 5,067,489 | A |   | 11/1991 | Lind et al. |
| 5,240,491 | A |   | 8/1993  | Budinger et al. |
| 6,039,743 | A |   | 3/2000  | Quiachon et al. |
| 6,367,683 | B1 |  | 4/2002  | Rass et al. |
| 6,520,401 | B1 |  | 2/2003  | Miglietti |
| 6,846,575 | B2 |  | 1/2005  | Hasz et al. |
| 6,884,275 | B2 |  | 4/2005  | Okada et al. |
| 7,093,423 | B2 | * | 8/2006  | Gowda et al. ................... 60/204 |
| 2006/0249231 | A1 |  | 11/2006 | Bezerra et al. |
| 2007/0175546 | A1 |  | 8/2007  | Hoppe et al. |
| 2008/0017694 | A1 |  | 1/2008  | Schnell et al. |
| 2010/0291405 | A1 |  | 11/2010 | Vossberg |

FOREIGN PATENT DOCUMENTS

| DE | 3429286 A1 | 2/1986 |
| DE | 19729545 A1 | 1/1999 |
| DE | 10356562 A1 | 6/2005 |
| DE | 102004018668 A1 | 11/2005 |
| DE | 60029862 T2 | 3/2007 |
| DE | 10 2006 026 704 A1 | 12/2007 |
| DE | 60219026 T2 | 12/2007 |
| DE | 602004006437 T2 | 1/2008 |
| EP | 0515078 A2 | 11/1992 |
| EP | 1245327 A1 | 10/2002 |
| EP | 1689897 | 3/2005 |
| EP | 1716965 A1 | 11/2006 |
| EP | 1859880 A1 | 11/2007 |
| EP | 2113333 A2 | 4/2009 |
| WO | WO 2004/099456 | * 11/2004 .............. C22C 14/00 |
| WO | 2008087084 A1 | 7/2008 |

OTHER PUBLICATIONS

Gurgel, Jélio de A., et al. "Force-deflection properties of superelastic nickel-titanium archwires." American Journal of Orthodontics and Dentofacial Orthopedics 120.4 (2001): 378-382.*
PCT: International Search Report and Written Opinion of PCT/DE2011/001300; Jul. 25, 2012; 11 pages (only the ISR is translated).
German Patent and Trademark Office; Office Action for related application DE 10 2010 026 048.7; Jun. 16, 2011; 6 pages.
Eric Bastow; What is the best way to solder to Nitinol?; Indium Corporation Blogs; posted on Feb. 28, 2011; retrieved on Jan. 13, 2016; http://www.indium.com/blog/what-is-the-best-way-to-solder-to-nitinol.php.
European Patent Office: Office Action of related EP Application No. 11 830 101.9; Rischard, Marc; Mar. 16, 2016; 7 pages including English machine translation of Examiner's Remarks.

* cited by examiner

*Primary Examiner* — Jessee Roe
(74) *Attorney, Agent, or Firm* — Howison & Arnott, LLP

(57) ABSTRACT

Solder alloy based on nickel is composed of a mixture with a first soldering material, a second soldering material, and a base material, wherein the base material is a nickel-based material which corresponds to the material to be soldered and is present in a proportion of 45-70% by weight in the mixture, the first soldering material is a nickel-based material including chromium, cobalt, tantalum, aluminum and boron, and is present in a proportion of 15-30% by weight in the mixture, and the second soldering material is a nickel-based material including chromium, cobalt, molybdenum, tungsten, boron and hafnium, and is present in a proportion of 15-25% by weight in the mixture.

8 Claims, No Drawings

NICKEL-BASED SOLDER ALLOY

CROSS-REFERENCE TO RELATED APPLICATIONS

This application is a U.S. National Phase application submitted under 35 U.S.C. §371 of Patent Cooperation Treaty application serial no. PCT/DE2011/001300, filed Jun. 16, 2011, and entitled NICKEL-BASED SOLDER ALLOY, which application claims priority to German patent application serial no. 10 2010 026 048.7, filed Jul. 3, 2010, and entitled NICKELBASIS-LOTLEGIERUNG.

Patent Cooperation Treaty application serial no. PCT/DE2011/001300, published as WO 2012/065581, and German patent application serial no. 10 2010 026 048.7, are incorporated herein by reference.

TECHNICAL FIELD

The present invention relates to a solder alloy based on nickel as well as to a method for producing such a solder alloy and to the use of the solder alloy for repairing turbine components, particularly aircraft turbine components made of a nickel-based material.

BACKGROUND

Gas turbines, such as airplane engines or stationary gas turbines, for example, are subject to high mechanical and thermal stress during operation. Owing to the stress during operation, particularly alternating thermal stressing, erosion and the like, the components of gas turbines, such as particularly blades that are exposed to the gas flow, can be damaged. Examples are thermal fatigue cracks, eroded surfaces and the like. Since the components are made of high-quality and thus expensive materials, and have to be produced by expensive manufacturing processes, replacement of corresponding damaged components is not economic, so that, during the maintenance and the repair of gas turbines, particularly airplane engines, the components have to be repaired. For this purpose, soldering methods are used, besides welding methods.

From DE 10 356 562 A1, DE 10 2004 018 668 A1, EP 1 859 880 A1 or from U.S. Pat. No. 4,830,934 as well as EP 1 689 897 B1, corresponding solder alloys are known.

These alloys have to have a number of properties in order to be able to be used as repair solder alloys for turbine components. Thus, to the extent possible, the soldering material which is used to fill cracks, for example, must have the same properties as the material to be repaired, so that the repaired sites do not represent starting sources of defects. In addition, the solder alloys must also be processable appropriately, so that they can be used for the repair. Accordingly, a high optimization requirement exists for such alloys, in order to implement the partially opposite properties optimally.

SUMMARY

In one embodiment, a solder alloy based on nickel and a method of preparing and using the alloy are disclosed. The solder alloy includes a mixture with a first soldering material, a second soldering material, and a base material, wherein the base material is a nickel-based material, which corresponds to the material to be soldered and is present in a proportion of 45-70% by weight in the mixture. The first soldering material is a nickel-based material which comprises chromium, cobalt, tantalum, aluminum and boron and is present in a proportion of 15-30% by weight in the mixture, and the second soldering material is a nickel-based material which comprises chromium, cobalt, molybdenum, tungsten, boron and hafnium and is present in a proportion of 15-25% by weight in the mixture. In one aspect, both the chromium content and also the cobalt content are higher in the case of the first soldering material than in the case of the second soldering material, and wherein the first soldering material, the second soldering material, and the base material are in the form of a powder and mixed or as a paste. The solder based alloy is suited to repairing gas turbine components, and in particular, airplane engine components.

DETAILED DESCRIPTION

Therefore, the problem is to produce a solder alloy in particular for repairing components of gas turbines, particularly airplane engines, by means of which the components made of nickel-based materials, particularly nickel-based superalloys, can be repaired reliably, wherein the inherent profile of the repaired component is not substantially changed and it is also ensured that a simple machining is possible.

A particularly balanced profile of the properties of the solder alloy can be achieved with regard to the material properties to be achieved and also the processing properties, in that a mixture composed of three components is produced, wherein the components can be particularly in powder form, and they can be mixed in powder form. The components of the solder alloy comprise a first soldering material, a second soldering material, and a base material. The base material is a nickel-based material which corresponds to the material to be soldered and is in a present in a proportion 45-70% by weight in the mixture.

The first soldering material is also a nickel-based material which comprises chromium, cobalt, tantalum, aluminum and boron as alloy components as well as nickel as main component. In this connection, it should be noted that, in the present disclosure, a nickel-based material denotes a material which has nickel as the largest alloy component.

According to one embodiment, such nickel-based materials comprise more than 50% by weight of nickel. However, in the present disclosure, a nickel-based material also denotes a material wherein the nickel content is less than 50% by weight, but nickel is the largest alloy component.

The first soldering material is present in a proportion of 15-30% by weight in the mixture of the solder alloy.

The second soldering material is also a nickel-based material which comprises chromium, cobalt, molybdenum, tungsten, boron and hafnium as alloy components. The second soldering material is present in a proportion of 15-25% by weight in the mixture.

According to a preferred embodiment, the proportion of the first soldering material in the mixture can be 20-25% by weight and/or the proportion of the second soldering material can be 18-22% by weight.

With the exception of unavoidable contaminations, the first soldering material cannot contain any molybdenum and/or tungsten and/or niobium and/or hafnium and/or palladium, while the second soldering material cannot comprise any tantalum, with the exception of unavoidable contaminations. However, the second soldering material can furthermore contain niobium and/or palladium.

In an embodiment of the solder alloy, the content of chromium and of cobalt in the case of the first soldering material can be selected to be higher than in the case of the second soldering material.

Due to an appropriate selection of the corresponding alloy components in the case of the first soldering material and in the case of the second soldering material, it is possible, particularly in combination with the proportion of the base material, which can correspond to the material to be soldered, to adjust a corresponding suitable profile of the properties of the solder alloy, and a composition that is appropriate for the application case, wherein the individual alloy components influence the strength properties by forming hardening phases, for example, carbides, or, as in the case of boron, for example, favorably affect the melting point of the solder alloy. Other soldering components, such as yttrium and hafnium, for example, can advantageously influence the wetting behavior and the flowability of the molten solder alloy. The oxidation resistance of the soldered areas is increased, for example, by aluminum. Overall, it has been found that, by means of the solder alloy according to the invention, an advantageous repair of engine components made of nickel-based materials, particularly nickel-based superalloys, is possible in an advantageous manner.

In particular, the first soldering material can contain 10-20% by weight of chromium, particularly 13-16% by weight of chromium, 5-15% by weight of cobalt, particularly 9-11% by weight of cobalt, 2-4% by weight of tantalum, particularly 2.5-3.5% by weight of tantalum, 3-4% by weight of aluminum, particularly approximately 3.5% by weight of aluminum, 2-4% by weight of boron, particularly 2.5-3.5% by weight of boron, and 0.05-0.15% by weight of yttrium and nickel as the remainder.

The second soldering material can contain 2-4% by weight of chromium, particularly 2.5-3.5% by weight of chromium, 3-7% by weight of cobalt, particularly 5-6% by weight of cobalt, 0.5-1.5% by weight of molybdenum, particularly 0.9-1.1% by weight of molybdenum, 5-10% by weight of tungsten, particularly 7-8% by weight of tungsten, 0.1-1% by weight of niobium, particularly 0.2-0.5% by weight of niobium, 0.1-1.5% by weight of aluminum, particularly 0.5-1% by weight of aluminum, 2-4% by weight of boron, particularly 2.5-3.5% by weight of boron, and 0.5-1.5% by weight of palladium, particularly 0.75-1.25% by weight of palladium as well as nickel as residue.

For repairing airplane engine components made of the nickel-based alloy MAR-M-247 having a composition of 0.13-0.17% by weight of carbon, maximum 0.2% by weight of magnesium, maximum 0.15% by weight of silicon, maximum 0.015% by weight of phosphorus, maximum 0.01% by weight of sulfur, 8-8.8% by weight of chromium, 9-11% by weight of cobalt, 0.5-0.8% by weight of molybdenum, 2.8-3.3% by weight of tantalum, 9.5-10.5% by weight of tungsten, maximum 0.1% by weight of niobium, 0.9-1.2% by weight of titanium, 5.3-5.7% by weight of aluminum, 0.01-0.02% by weight of boron, 1.2-1.6% by weight of hafnium, maximum 0.25% by weight of iron, maximum 0.1% by weight of copper, 0.03-0.08% by weight of zirconium, 0.0005% by weight of lead, 0.00003% by weight of tungsten, 0.0001% by weight of selenium, 0.00005% by weight of tellurium, 0.00005% by weight of titanium and nickel as residue, a solder alloy according to the invention is prepared by making a powder composed of the base material MAR-M-247 and mixing it with the soldering materials 1 and 2 in accordance with the above-indicated mixing ratios.

The soldering material 1 here has a composition of 14% chromium, 10% cobalt, 2.75% tantalum, 3.5% by weight of aluminum, 2.75% by weight of boron and 0.1% by weight of yttrium and nickel as the remainder. The soldering material 2 has the following composition: 2.9% by weight of chromium, 5.5% by weight of cobalt, 1.1% by weight of molybdenum, 7.4% by weight of tungsten, 0.3% by weight of niobium, 0.8% by weight of aluminum, 2.9% by weight of boron, 3% by weight of hafnium, 1.1% by weight of palladium and nickel as the remainder. The two soldering materials 1 and 2 are also in powder form, and they are mixed in powder form with the base material, so that a solder alloy powder according to the invention is formed. The solder alloy powder can then be used directly for repairing corresponding engine components.

Although the present invention has been described in detail using the reference example, it is obvious to the person skilled in the art that the invention is not limited to said example, and that the scope of protection is defined instead by the added claims and in the context of the claims variations are possible by using another combination of characteristics or omission of individual characteristics.

The invention claimed is:

1. Method for producing a solder alloy for soldering a component made of a nickel-based material in which nickel is the largest alloy component by weight, the method comprising the following steps:

providing three components composed of a first soldering material, a second soldering material, and a base material, wherein the base material is a nickel-based powder material, which has the same composition as the nickel-based material of the component to be soldered and is present in a proportion of 45-70% by weight in the total weight of the three components, the first soldering material is a nickel-based powder material which has nickel as the largest alloy component by weight and further comprises chromium, cobalt, tantalum, aluminum and boron and is present in a proportion of 15-30% by weight in the total weight of the three components, and the second soldering material is a nickel-based powder material which has nickel as the largest alloy component by weight and further comprises chromium, cobalt, molybdenum, tungsten, boron and hafnium and is present in a proportion of 15-25% by weight in the total weight of the three components, wherein both the chromium content and also the cobalt content are higher in the case of the first soldering material than in the case of the second soldering material, and mixing together the base material powder, the first soldering material powder and the second soldering material powder, thereby forming the solder alloy in a powder form.

2. Method according to claim 1, further comprising the step of using the solder alloy for soldering the component to be soldered when the solder alloy is in the form of a powder.

3. Method according to claim 1, further comprising the following steps:

forming a paste using the solder alloy in powder form; and using the solder alloy for soldering the component to be soldered when the solder alloy is in the form of the paste.

4. The method of claim 1, further comprising the step of using the solder alloy to repair the component to be repaired, wherein the component to be soldered is a gas turbine-component.

5. The method of claim 4, wherein the gas turbine component is an airplane engine component.

6. The method of claim 1, wherein the nickel-based alloy of the component to be soldered is a nickel-based superalloy and the base material is a powder of the same nickel-based superalloy.

7. The method of claim 1, wherein the first soldering material has a composition of 14% by weight of chromium, 10% by weight of cobalt, 2.75% by weight of tantalum, 3.5% by weight of aluminum, 2.75% by weight of boron and 0.1% by weight of yttrium and nickel as the remainder.

8. The method of claim 1, wherein the second soldering material has a composition of 2.9% by weight of chromium, 5.5% by weight of cobalt, 1.1% by weight of molybdenum, 7.4% by weight of tungsten, 0.3% by weight of niobium, 0.8% by weight of aluminum, 2.9% by weight of boron, 3% by weight of hafnium, 1.1% by weight of palladium and nickel as the remainder.

* * * * *